United States Patent Office 3,455,724
Patented July 15, 1969

3,455,724

PROCESSES OF PREPARING VANADIUM SUBOXIDE COATINGS

Robert O. Teeg, Grosse Pointe Farms, and Robert W. Hallman, St. Clair Shores, Mich., assignors, by mesne assignments, to Teeg Research, Inc., Detroit, Mich., a corporation of Delaware No Drawing. Filed Apr. 7, 1964, Ser. No. 358,065
Int. Cl. C23c *13/00*
U.S. Cl. 117—62 11 Claims The invention relates to thin films made of vanadium suboxides and to processes for preparing such thin films on suitable support substrates.

Certain metallic elements may be deposited upon a substrate by various methods and processes including, for example, high vacuum deposition, electrodeposition, electroless deposition and sputtering. Such methods and processes are well known in the art and generally achieve practical satisfactory results as long as the thin films consist of certain metals or alloys. However, the preparation of continuous and homogeneous crystalline thin films of metal oxides, and particularly metal suboxides, is considerably more difficult, and conventional methods often lead to failure caused generally by disproportionation or even complete disassociation of the elements.

Vanadium suboxides of the general formula $VO_x$ wherein $x$ is a number comprised between 1.50 and 2.02, i.e., wherein the average valence of vanadium is comprised between 3.00 and 4.04 have been found to be very difficult to be deposited in thin film forms upon a substrate by any of the conventional methods hitherto known without loss of the desired composition. Vanadium suboxides, such as vanadium dioxides, have been found by the present inventors to be endowed of certain physical qualities that render thin films thereof deposited upon appropriate substrates and used in appropriate apparatus to be particularly useful, for example, as a thermistor, or in infrared detection or infrared imaging devices. However, it was also found that the manufacture of thin films by conventional methods such as direct evaporation of vanadium suboxides followed by condensation on a support substrate usually results in disproportionation and loss of the desired composition.

The preparation of vanadium suboxide thin films by the processes of the present invention results in finished articles having the appropriate chemical and physical requirement, and uniform results from one film to another have been attained under exactly controlled and reproducible conditions.

A principal object of the present invention is, therefore, to provide vanadium suboxide thin films having desirable and precisely defined chemical and physical properties. These features of the invention which are believed to be novel are set forth with particularity in the claims appended hereto, and the invention will be better understood, and other objects and advantages thereof will become readily apparent, from a consideration of the following description.

The preparation of thin films of vanadium suboxides according to the invention may be effected by several alternate processes as hereinafter explained in detail.

According to a preferred process, vanadium pentoxide of the general formula $V_2O_5$ is placed in an inert boat, made of tungsten or preferably platinum, which is disposed in a bell jar or other container provided with means for heating the boat and the support substrate upon which the thin film is to be condensated, together with means, if desired, for evacuating or controlling the atmosphere of the bell jar or container.

The support substrate on which the film is to be deposited may be a highly polished platinum, glass or quartz plate, previously thoroughly cleaned, for example, by washing in a weak acid solution followed by rinsing in distilled water and drying in a stream of inert gas. The substrate is placed in the bell jar preferably on a heating element such as a tungsten heater, and the jar atmosphere is evacuated to a pressure of $10^{-4}$ mm. Hg to $10^{-6}$ mm. Hg, preferably to a pressure of $10^{-5}$ mm. Hg. The substrate is heated to a temperature of from about 300° C. to about 350° C. The boat containing the vanadium pentoxide is heated to a temperature in the range of 500° C. to 850° C., and preferably in the range of 650° C. to 700° C.

Vanadium pentoxide is thus continuously evaporated from the boat and condensated upon the cooler substrate until a film of the required thickness has been deposited on the substrate. This may require as little as a few minutes to as high as 12 hours or more. A large evaporation area of the boat, and higher evaporation temperature will, of course, result in shortened time sufficient for the deposition of a film of the desired thickness. Lower evaporation temperatures, on the contrary, result in lengthening of the time for depositing a required film.

The substrate with a thin film of vanadium pentoxide deposited thereon is removed from the evaporating container or bell jar and transferred to a second bell jar or container, which may be a high silica glass ampoule, f.e., provided with means for evacuating to vacuum of $10^{-1}$ mm. Hg to $10^{-3}$ mm. Hg. A "getter" consisting of a boat containing vanadium sesquioxide, of the general formula $V_2O_3$, is disposed proximate to the substrate within the bell jar, and the atmosphere is evacuated to a pressure of approximately $10^{-2}$ mm. Hg. The substrate and the "getter" are heated to a temperature in the range of 400° C. to 600° C. and preferably in the neighborhood of 500° C., and maintained at that temperature for sufficient time to completely reduce the film of vanadium pentoxide to a vanadium suboxide such as vanadium dioxide of a formula substantially such as $VO_2$, but generally of the formula $VO_x$, wherein $x$ is a number comprised between 1.50 and 2.02. If the "getter" contains the appropriate stoichiometric amount of vanadium sesquioxide, no special precaution in timing of the operation is required as the final vapor pressure of both the vanadium pentoxide film being reduced and of the "getter" are equal, since the vanadium pentoxide is reduced to vanadium suboxide ($VO_x$) and the vanadium sesquioxide is oxidized also to vanadium suboxide. The complete reduction of a 10 micron film of vanadium pentoxide to vanadium suboxide, under such conditions, takes approximately 12 hours at 500° C. under an atmosphere of $10^{-2}$ mm. Hg.

Alternately, if an excess of "getter" is used, the time required for reduction of the film is decreased, but timing of the operation becomes critical.

As another alternate method, the use of a "getter" may be dispensed with by simply heating the film of vanadium pentoxide in a bell jar under reduced oxygen pressure, between $10^{-1}$ mm. Hg and $10^{-3}$ mm. Hg, and by simultaneously and continuously evacuating the atmosphere so as to reduce the oxygen vapor pressure above the film until the film has completely been reduced to vanadium suboxide. In this method also, proper control of the temperature, pressure and timing parameters is critical.

The reverse of the process hereinbefore explained has also been found to achieve substantially good results in the preparation of vanadium suboxide thin films. This reverse process consists in first evaporating vanadium metal, or a lower vanadium oxide than the one desired, under vacuum or controlled atmosphere, and condensating as a thin film on a substrate under conditions substantially similar to the conditions precedently indicated. The thin film is subsequently oxidized by being heated under a reduced atmosphere in the presence of a heated higher oxide than the one desired, for a predetermined time.

For example, vanadium metal is evaporated at a temperature of 1700° C. to 2000° C. under reduced atmosphere of $10^{-4}$ mm. Hg to $10^{-6}$ mm. Hg, and condensated on a substrate maintained at a slightly lower temperature. The substrate coated with a vanadium thin film is then oxidized by being heated at a temperature of about 550° C. in an atmosphere of oxygen at a pressure equal to the equilibrium vapor pressure of oxygen above the appropriate suboxide, such as, f.e., $VO_{2-0}$. If a temperature of 550° C. is used, the pressure should be $10^{-1}$ mm. Hg.

A thin film prepared by the methods and processes herein disclosed generally presents strong adhesion to the base material, if the substrate is substantially clean. Where it is desired to obtain a thin film which may be easily separated from the substrate surface, the latter is purposely previously coated with a thin layer of a material such as carbon or silicone oil, for example, which permits the vanadium suboxide film to be peeled off the substrate and transferred to any other surface.

Having thus described the invention, what is claimed as being new and desired to be secured by Letters Patent is:

1. Process for the preparation of a vanadium suboxide thin film which comprises evaporating vanadium pentoxide at a temperature in the range of 650° C. to 700° C. under a pressure of substantially $10^{-5}$ mm. Hg., condensating a thin film of such vanadium pentoxide upon a substrate, and subsequently heating said substrate at a temperature in the range of 450° C. to 550° C. under a pressure of substantially $10^{-2}$ mm. Hg. in the presence of a reaction medium consisting of an appropriate stoichiometric amount of vanadium sesquioxide.

2. Process for the preparation of a vanadium suboxide thin film which comprises evaporating vanadium pentoxide at a temperature in the range of 500° C. to 850° C., under a pressure in the range of $10^{-4}$ mm. Hg to $10^{-6}$ mm. Hg, condensating a thin film of such vanadium pentoxide upon a substrate, and subsequently heating said substrate at a temperature in the range of 400° C. to 600° C. under a pressure in the range of $10^{-1}$ to $10^{-4}$ mm. Hg in the presence of a reaction medium consisting of an appropriate stoichiometric amount of vanadium sesquioxide.

3. Process for the preparation of a vanadium suboxide thin film which comprises depositing a vacuum evaporation and condensation thin film of vanadium pentoxide upon a substrate, and subsequently heating said substrate at a temperature in the range of 400° C. to 600° C. under a pressure of substantially $10^{-1}$ mm. Hg to $10^{-4}$ mm. Hg in the presence of a reaction medium consisting of an appropriate stoichiometric amount of vanadium sesquioxide.

4. Process for the preparation of a vanadium suboxide thin film which comprises evaporating vanadium pentoxide at a temperature in the range of 650° C. to 700° C. under a pressure of substantially $10^{-5}$ mm. Hg, condensating a thin film of such vanadium pentoxide upon a substrate, and subsequently heating said substrate at a temperature in the range of 450° C. to 550° C. under a pressure of substantially $10^{-2}$ mm. Hg in the presence of a reaction medium selected from the group consisting of vanadium oxides having greater affinity for oxygen than said vanadium pentoxide.

5. Process for the preparation of a vanadium suboxide thin film which comprises evaporating vanadium pentoxide at a temperature in the range of 500° C. to 850° C. under a pressure in the range of $10^{-4}$ mm. Hg to $10^{-6}$ mm. Hg, condensating a thin film of such vanadium pentoxide upon a substrate, and subsequently heating said substrate at a temperature in the range of 400° C. to 600° C. under a pressure in the range of $10^{-1}$ mm. Hg to $10^{-4}$ mm. Hg in the pressence of a reaction medium selected from the group consisting of vanadium oxides having a greater affinity for oxygen than said vanadium pentoxide.

6. Process for the preparation of vanadium suboxide of the general formula $VO_x$ wherein $x$ is comprised between 1.50 and 2.02 which comprises evaporating vanadium metal at a temperature in the range of about $10^{-4}$ mm. Hg to about $10^{-6}$ mm. Hg, condensating a thin film of such vanadium upon a substrate, and subsequently oxidizing said thin film by heating in an atmosphere of oxygen at a pressure substantially equal to the equilibrium vapor pressure above said vanadium suboxide, said oxygen being supplied by heating a higher oxide of vanadium.

7. Process for the preparation of vanadium suboxide of the general formula $VO_x$ wherein $x$ is comprised between 1.50 and 2.02 which comprises evaporating a lower vanadium oxide under a pressure in the range of about $10^{-4}$ mm. Hg to about $10^{-6}$ mm. Hg, condensating a thin film of such lower vanadium oxide upon a substrate, and subsequently oxidizing said thin film by heating in an atmosphere of oxygen at a pressure substantially equal to the equilibrium vapor pressure above said vanadium suboxide, said oxygen being supplied by heating a higher oxide of vanadium.

8. Process for the preparation of a vanadium suboxide thin film which comprises preparing by vacuum evaporation a thin film of a vanadium higher oxide upon a substrate, and subsequently heating said substrate at a temperature in the range of 400° C. to 600° C. under a pressure in the range of $10^{-1}$ mm. Hg to $10^{-4}$ mm. Hg in the presence of a reaction medium selected from the group consisting of vanadium oxides having greater affinity for oxygen than said vanadium high oxide.

9. Process for the preparation of a vanadium suboxide thin film which comprises preparing by vacuum evaporation and condensation a thin film of a vanadium higher oxide upon a substrate, and subsequently reducing said thin film at a temperature in the range of 400° C. to 600° C. under an atmospheric pressure in the range of $10^{-1}$ mm. Hg to $10^{-4}$ mm. Hg by simultaneously and continuously maintaining above said thin film an atmospheric pressure lower than the oxygen vapor pressure above said thin film until said film has been reduced to vanadium suboxide.

10. Process for the preparation of a vanadium suboxide thin film which comprises evaporating vanadium pentoxide at a temperature in the range of 650° C. to 700° C. under a pressure of substantially $10^{-5}$ mm. Hg, condensating a thin film of such vanadium pentoxide upon a substrate, and subsequently heating said substrate at a temperature in the range of 450° C. to 550° C. under a pressure in the range of $10^{-1}$ to $10^{-3}$ mm. Hg whilst simultaneously continuously maintaining such pressure until said thin film has been reduced to said vanadium suboxide.

11. Process for the preparation of a vanadium suboxide thin film which comprises evaporating vanadium pentoxide at a temperature in the range of 500° C. to 850° C. under a pressure in the range of $10^{-4}$ mm. Hg to $10^{-6}$ mm. Hg, condensating a thin film of such vanadium pentoxide upon a substrate, and subsequently heating said substrate at a temperature in the range of 400° C. to 600° C. under a pressure in the range of $10^{-1}$ to $10^{-3}$ mm. Hg whilst simultaneously continuously maintaining such pressure until said thin film has been reduced to said vanadium suboxide.

References Cited

UNITED STATES PATENTS

| | | | |
|---|---|---|---|
| 3,042,822 | 7/1962 | Savage et al. | 117—228 X |
| 3,208,873 | 9/1965 | Ames et al. | 117—106 |

OTHER REFERENCES

Holland: Vacuum Deposition of Thin Films, 1956, pp. 109 to 114 and 444 to 447 relied upon.

ALFRED L. LEAVITT, Primary Examiner

A. GOLIAN, Assistant Examiner

U.S. Cl. X.R.

117—106, 119

TRI-101-A

UNITED STATES PATENT OFFICE

CERTIFICATE OF CORRECTION

Patent No. 3,455,724 Dated July 15, 1969

Inventor(s) Robert O. Teeg et al

It is certified that error appears in the above-identified patent and that said Letters Patent are hereby corrected as shown below:

IN THE CLAIMS

Column 4, line 2, after "a" cancel "temperature" and insert thereinstead - - pressure - -

SIGNED AND SEALED OCT 6 - 1970

(SEAL)
Attest:

Edward M. Fletcher, Jr.
Attesting Officer

WILLIAM E. SCHUYLER, JR.
Commissioner of Patents